United States Patent [19]

Masaru

[11] Patent Number: 5,363,633
[45] Date of Patent: Nov. 15, 1994

[54] POSITION ADJUSTMENT STRUCTURE USING AN ECCENTRIC SHAFT

[76] Inventor: Tsuda Masaru, 2250-2, Ooaza-Takahagi, Hidaka Shi, Saitama 350-12, Japan

[21] Appl. No.: 103,266

[22] Filed: Aug. 9, 1993

[30] Foreign Application Priority Data

Aug. 7, 1992 [JP] Japan .................. 4-251816

[51] Int. Cl.$^5$ .................. A01D 34/54; A01D 34/56
[52] U.S. Cl. .................. 56/17.2; 56/320.1; 172/43; 172/407; 280/43.13
[58] Field of Search .................. 56/17.2, 17.1, 320.1, 56/214; 172/43, 395, 422, 408, 413, 407; 280/43.13, 43.17, 43.23

[56] References Cited

U.S. PATENT DOCUMENTS

| | | | |
|---|---|---|---|
| 3,334,911 | 8/1967 | Enters | 56/17.2 X |
| 3,371,940 | 3/1968 | Sinclair et al. | 280/43.23 |
| 4,738,562 | 4/1988 | Howsley | 280/43.17 X |
| 4,905,463 | 3/1990 | Eilles | 56/17.2 |
| 5,230,208 | 7/1993 | Hess et al. | 56/17.2 |

Primary Examiner—Stephen J. Novosad
Attorney, Agent, or Firm—Armstrong, Westerman, Hattori, McLeland & Naughton

[57] ABSTRACT

A device for adjusting the height of a vehicle, by rotating the angle of a base shaft eccentrically supporting a support shaft. Wheels are fitted to a support shaft eccentrically connected to a base shaft rotatably supported by bearings disposed on push-pull type electric mowing machine. One of the ends of a connecting member is fixed to the core of the base shaft and an adjustment device is fitted to the other end of the connecting member. Alternatively, a base shaft is supported concentrically and rotatably at the core of a composite shaft type mowing machine in such a manner as to protrude from both end portions of a rotary shaft. The base shaft is rotatably supported by an apparatus main body at both end portions of the base shaft and eccentrically with respect to the base shaft, and wheels are fitted to both end portions of the support shaft. An adjustment pulley is fixed to the base shaft either inside or outside the bearings. The position of the height is adjusted by controlling this adjustment member.

6 Claims, 5 Drawing Sheets

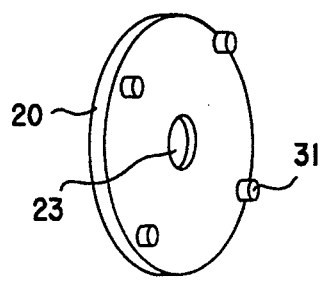
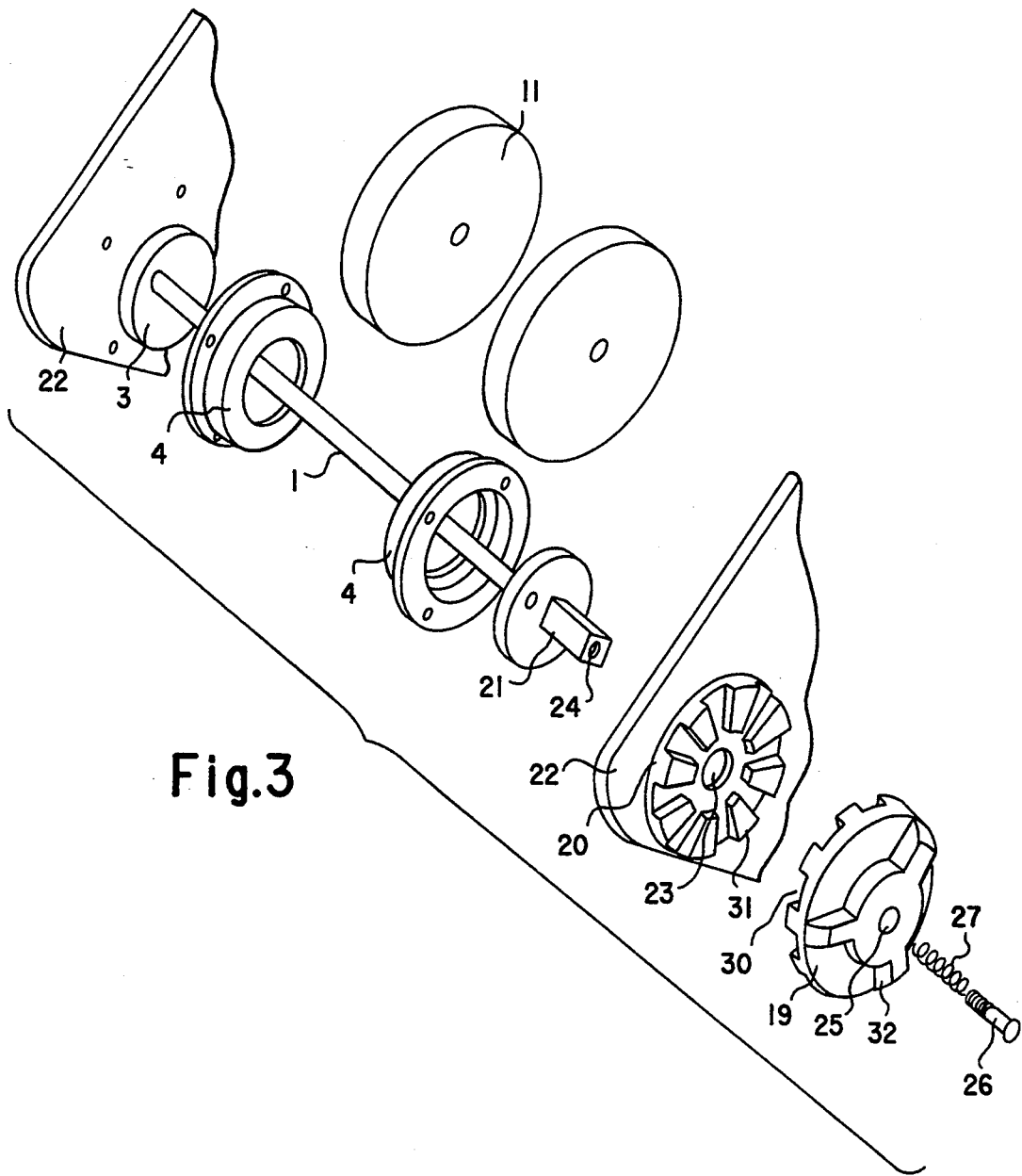

POSITION ADJUSTMENT STRUCTURE USING AN ECCENTRIC SHAFT

FIELD OF THE INVENTION

This invention provides a position adjustment structure wherein a support shaft eccentrically disposed inside a rotating or rotatable base hub can be adjusted at a predetermined angle to the axis. The position of the base hub, primarily its height, with respect to the support shaft, can be adjusted, and the base hub is assembled concentrically and rotatably in a rotary shaft. This position adjustment structure can adjust the height of mowing machines, cultivators, cleaning machines, vehicles, robots, etc., of a traction type, a push-pull type, a self-propelling type, etc., within a predetermined range, and makes it possible to accommodate varying mowing height, plowing depth, travelling condition, and automatic operation through an easy manual operation or a remote control operation.

DESCRIPTION OF THE RELATED ART

To adjust the height of an apparatus relative to an object such as the height of a vehicle relative to the ground, it has been customary in the past to employ a structure wherein a support shaft which supports right and left support wheels is fitted to an intermediate part of a rotary support member at right and left ends in such a manner as to be capable of rocking. One of the ends of the support member is pivotally fitted to a car body with the other end penetrating through an adjustment port defined in the car body, and handles are so disposed as to protrude outside the car body. The right and left handles are individually operated for fixing to a stage of the adjustment port so as to adjust the height. During this adjustment operation, the support member must be fitted to a required stage of the adjustment port with a clattering noise even with a light-weight apparatus, and a large impact with a bang is generated with a large-scale apparatus. Such a structure has widely been employed in lawn mowers, mowing machines and cultivators.

Besides the structure described above, direct control by a rack-and-pinion type structure or a modification thereof, hydraulic devices, etc., have been used. However, such apparatuses are expensive and bulky, and it has been difficult to accomplish the height adjustment with a compact apparatus. To accomplish automation, the apparatus becomes bulky.

The Applicant of the present invention previously proposed a structure for a mowing machine or a cultivator in Japanese Patent Application No. 301029/1988, wherein a support shaft for wheels is disposed inside a rotary shaft of a mowing rotary member. However, this structure cannot change the height of the support shaft with respect to the rotary shaft or its position in a longitudinal direction.

SUMMARY OF THE INVENTION

It is a first object of the present invention to provide a position adjustment structure which can adjust the positions of height of right and left two wheels by adjustment at one position on one side.

It is a second object of the present invention to provide a position adjustment structure which can make a height adjustment mechanism of a support shaft compact so as to reduce the size of an apparatus.

It is a third object of the present invention to eliminate the necessity for defining a complicated opening in an apparatus main body.

It is a fourth object of the present invention to make the structure compact without using directly a rack-and-pinon structure or a similar type.

It is a fifth object of the present invention to provide an apparatus which does not generate noise.

It is a sixth object of the present invention to provide a structure which makes it possible to accomplish automation of an apparatus necessary for a remote control apparatus.

It is a further object of the present invention to provide a moving operation apparatus which enables the height of the operation member correctly to follow the undulation of the ground, of a two-wheel one-shaft type using a compact traction type reel type rotary member.

In short, the present invention aims at providing a compact adjustment structure or a constituent component of a robot capable of freely changing the operation height of a running operation vehicle such as a mowing machine, a lawn mower, a road cleaner and a cultivator.

The present invention relates to a position adjustment structure which primarily adjusts the position of a support shaft, mainly the height, in a moving article such as a lawn mower, a mowing machine and a cultivator, and additionally adjusts its position in a longitudinal direction in parallel with the height.

The first structure of the present invention adjusts the height of a support shaft eccentrically disposed at the core of a base hub by a rotating angle of the base hub.

The second structure adjusts the height of the support shaft eccentrically disposed at the core of the base hub by a rotating angle of the base hub by disposing rotatably the base hub inside the core of a rotary shaft.

More specifically, in the first embodiment of the present invention, each base hub is rotatably supported by right and left bearings fitted to an apparatus main frame. A support shaft is eccentrically disposed on the base hub, and support wheels are supported by the support shaft. The other end of a connecting member having one of the ends thereof fixed to the core of the base hub is passed through a connecting hole having a size rotatable to the outside of a support wall. An adjustment member is supported by the connecting member outside the support wall in such a fashion that the adjustment member can flexibly slide in a direction of the support shaft by a predetermined distance while keeping the same phase as that of the base shaft. An anchor member is disposed to the adjustment member on the side of the support wall and is engaged with an anchor member disposed on the support wall, and the eccentric support shaft can be thus anchored to the core of the base hub at a predetermined angle.

The engagement structure between the adjustment member and the anchor member described above can be accomplished by employing a radial groove engaged with protuberances, specifically, a type where protuberances disposed at an equal angle and on the same circumference are fitted to anchor holes disposed on the circumference equal to the former, a control type where the adjustment member is a gear and this gear is suitably controlled by the engagement with a rack, or by control of a timing belt, and so forth. In the case of automatic control, a gear mechanism or a timing belt is further added, and a remote operation can be attained by the use of a servo motor, etc. According to this structure, the base hub and the adjustment member can be compactly assembled, and the apparatus main body itself can be assembled by only a fitting work. Further, the height of the support shaft can be adjusted easily and conveniently by manipulating the adjustment member disposed on one side. The height can be adjusted while the apparatus is being operated in either the case of the self-propelling type or the traction type, and step-less control can be made by combining gears, timing pulleys, clutches, and so forth.

Another embodiment of the present invention includes a composite shaft comprising large, medium and small shafts. A medium shaft is rotatably supported by an apparatus main body and a phase adjustment device is engaged with the medium shaft so as to constitute a base shaft. A small shaft is disposed eccentrically to the base shaft and is used as a support shaft of the apparatus main frame, and support wheels are fitted to the support shaft. The large shaft is provided rotatably to the base shaft through bearings, and is driven by a prime mover disposed on the apparatus main fame. An example of this position adjustment structure of a composite shaft by an eccentric shaft has the structure wherein the base shaft is supported concentrically with, and rotatably by, the core portion of a rotary shaft and is allowed to protrude outward from both ends of the rotary shaft, and is rotatably supported by the support member at both ends. The support shaft disposed eccentrically on the base shaft is controlled by a gear mechanism or an anchor structure comprising a timing belt and a clutch, so that it can be fixed freely at a predetermined angle and the position of height can be controlled, and the wheels are fitted to this support shaft.

According to this embodiment, the base shaft can be supported inside the rotary shaft of a cultivator, a mowing machine or other reel type rotary working apparatus. Therefore, this structure can be applied to a one-shaft two-wheel type traction type apparatus, and the apparatus can be made compact. Consequently, automatic control of the height or automatic operation by the use of a servo motor as a mechanism of a robot construction becomes possible.

Furthermore, it is possible to employ various other structures such as (1) a structure wherein the support shaft is divided into a right and left shaft and is disposed either stationarily or rotatably inside the base shaft of the medium shaft, for example, among the large, medium and small shafts; (2) a structure wherein both ends of the large shaft as the rotary shaft are fixed to a bearing case; and (3) a structure wherein the base shaft is divided into right and left shafts and is rotatably disposed inside the rotary shaft and the support shaft is disposed either stationarily or rotatably in the base shaft. Among these various structures of the composite shaft, the present invention will be explained in detail.

BRIEF DESCRIPTION OF THE DRAWINGS

FIG. 3 is an exploded perspective view of the position adjustment structure of the first embodiment shown in FIG. 1;

FIG. 4 is a perspective view of the inner surface of an adjustment member in the first embodiment shown in FIG. 3;

FIG. 5 is a perspective view of an anchor member in a second embodiment of the present invention;

FIGS. 1 to 4 show a first embodiment of the application of the present invention to a manual push-pull type electric mowing machine. Both right and left ends of a support shaft 1 supporting rear wheels 11 are fixed at eccentric positions to a pair of base hubs 3, and the rear wheels 11 are rotatably fitted inside these positions. The base hubs 3 are rotatably disposed by bearings 4 in the proximity of the inner wall of support walls 37 on both sides. A square hole is bored at the center of one of the base hubs 3 so as to penetrate through hub 3. One of the ends of a prismatic connecting member 21 is fitted into, and fixed to, this square hole, and the other end is slidably fitted into an adjustment port 29 of an adjustment member 19 in such a manner as to be capable of sliding inward and outward through the support wall 22 and through a through-hole 23 of an anchor member 20. An adjustment screw 26 is fastened to the inner depth of a connecting screw hole 25 and an adjustment spring 27 is loosely fitted to this screw 26. The adjustment member 19 and its handle 32 are allowed to flexibly move inward and outward (in the longitudinal direction of the connecting member) through the adjustment screw 27 in a distance a little greater than the height of an anchor protuberance. The adjustment member 19 is pulled in a direction represented by an arrow P (FIG. 1) and an adjustment groove 30 on the inner surface of this member 19 fits to, and engages with, the anchor protuberance 31.

Accordingly, when the handle 32 is pulled outward and the adjustment groove is removed from the anchor protuberance, the adjustment member becomes rotatable by the handle. When the groove is fitted to a stop protuberance after a predetermined number of rotations, the connecting member, too, is restricted by the inner wall and is rotated, so that the base hubs 3 rotate by the same angle, the support shaft 1 rotates by a predetermined angle, and a height is determined. In FIG. 2, the maximum height of the wheels is $H_1$ and the minimum height is $H_2'$.

Figure 1:
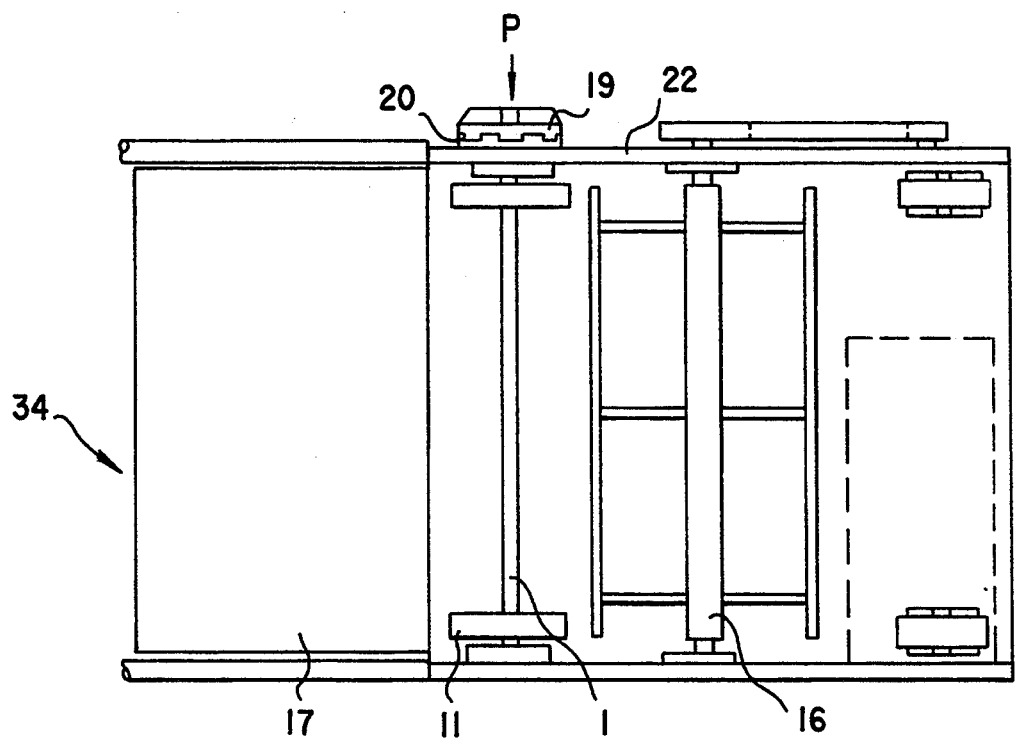
FIG. 1 is a schematic view of a first embodiment where a height position adjustment structure according to the present invention is applied to a push-pull type electric mowing machine.
Figure 2:
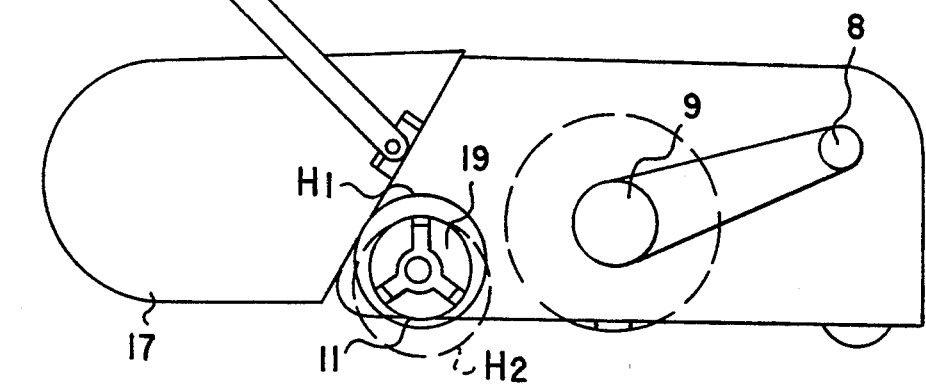
FIG. 2 is a left-hand side view of the first embodiment shown in FIG. 1.

In this case, if the strength of the support shaft 1, the base the base hubs 3 and their mutual fixing strength exceed a predetermined strength, the twist of the support shaft 1 due to the rotation of the adjustment member 19 is directly transmitted to the base hub 3 on the opposite side. Therefore, the base hub 3 on the opposite side, too, rotates to the equal angle to the rotating speed of the base hub 3 on the adjustment member side, and the support shaft 1 of both right and left wheels 11 keeps equilibrium of height. Accordingly, the wheels 11 supporting a machine frame 35 equally change the height.

As described above, this embodiment can change the height of the wheels on both sides by manipulating the handle 32 of the adjustment member 19 disposed on one of the sides, within the range of two times the eccentric distance. However, the number of stages of the change is different depending on the number of the anchor protuberances and the number of adjustment grooves in this example, and adjustment using a timing pulley and a belt or adjustment using gears, for example, can be made in place of the anchor structure described above, and automatic control of the height of the support shaft can be attained by engaging the connecting member with a servo motor.

FIG. 5 shows a second embodiment of the present invention in which the anchor member 20 has columnar engagement protuberances 31, which are equidistantly disposed at the same angle around the through-hole 23. If adjustment holes to which these protuberances can be loosely fitted are similarly disposed around the adjustment port 29 of the adjustment member 19 at the positions corresponding to these protuberances, the height can be adjusted in several stages. The number of stages can be determined by the number of the adjustment holes.

Figure 6:
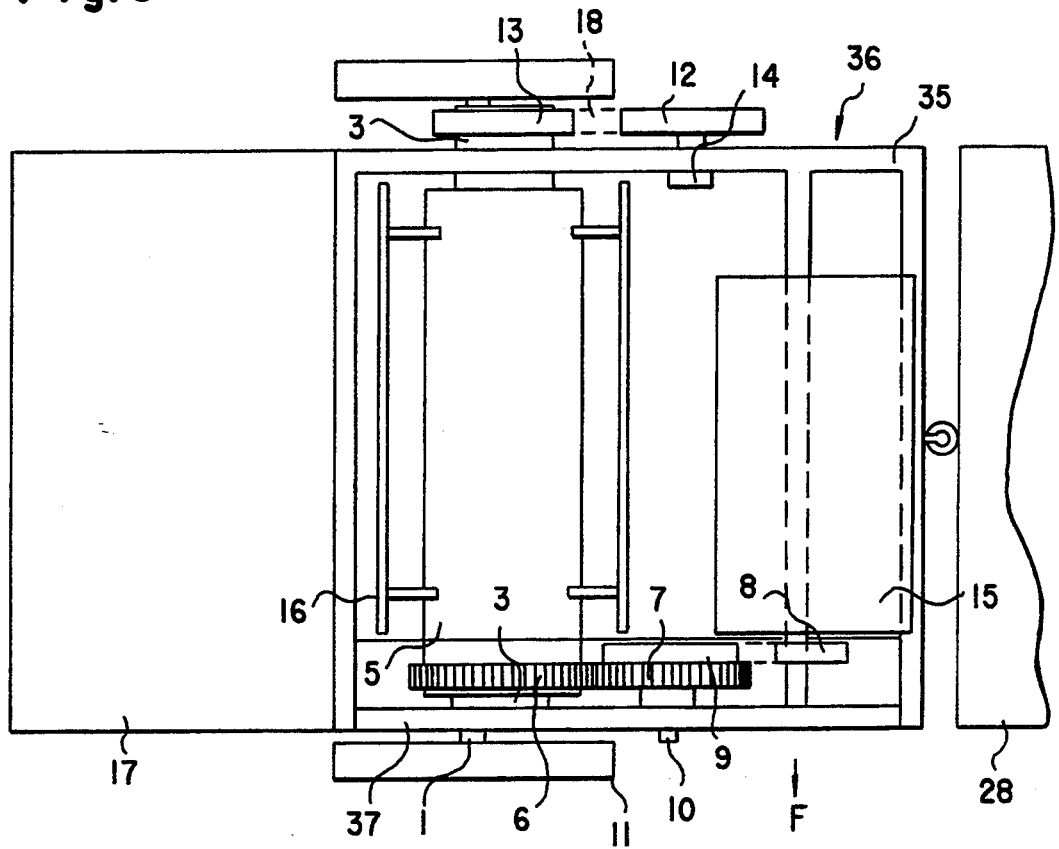
FIG. 6 is a reduced schematic plan view of a traction type composite shaft type mowing machine in a third embodiment of the present invention, with the upper cover of the machine frame removed.
Figure 7:
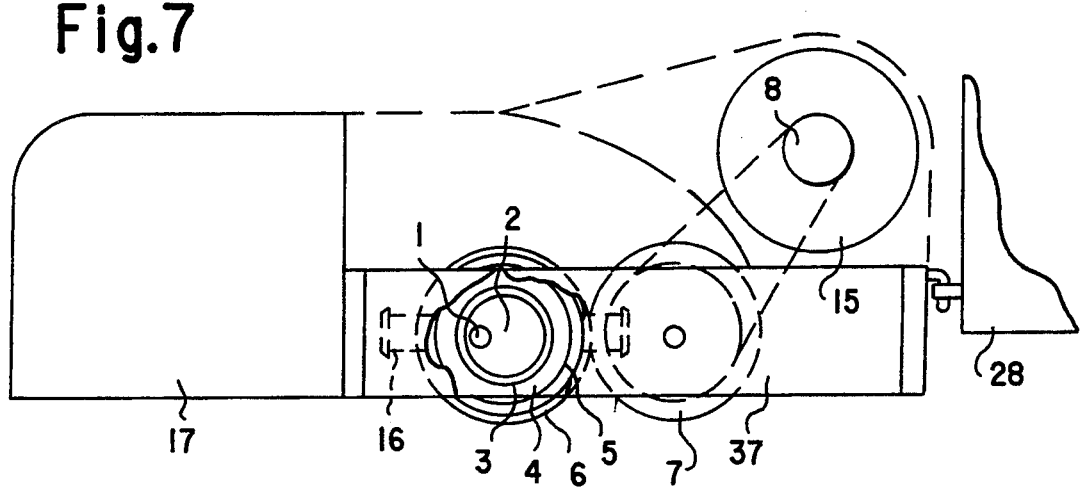
FIG. 7 is a perspective view of a left-hand surface portion of the embodiment shown in FIG. 6 when wheels are removed.
Figure 8:
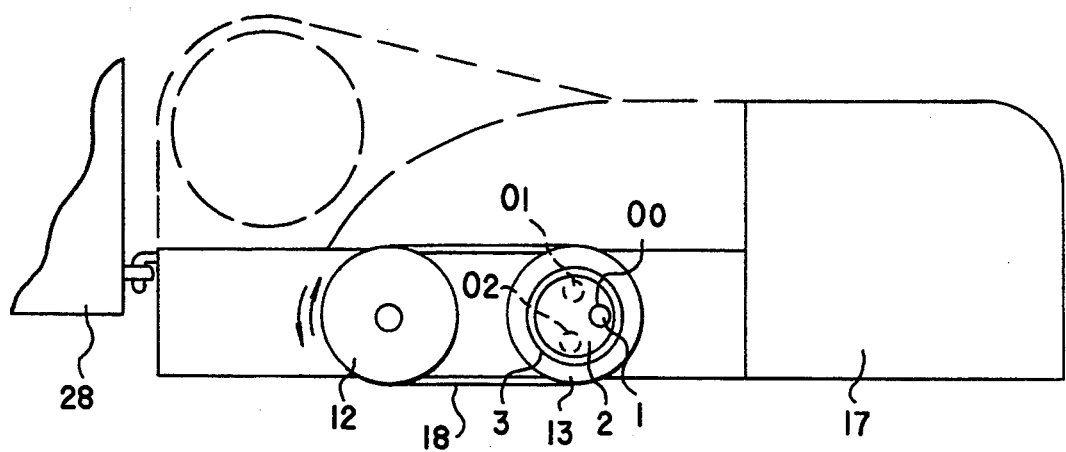
FIG. 8 is a right-hand side view of the embodiment shown in FIG. 6 when the wheels are removed.

FIGS. 6, 7 and 8 show a third embodiment of the present invention in which adjustment structure using composite rotary shafts is obtained by applying the present invention to a traction type uniaxial mowing machine. This example eliminates variations in mowing height resulting from undulations of the ground and accomplishes a compact machine body by the uniaxial structure. A main gear 6 is fixed to the outer periphery of one of the ends of the rotary shaft 5 disposed integrally with a mowing rotary member 16 at the center, and is meshed with a driving gear 7. The driving gear 7 is fixed to a transmission pulley 9 disposed inside the former, and this pulley 9 is interconnected by a belt to a motor pulley 8 and is driven by the latter. The rotary shaft 5 is a steel pipe shaft, and the bearings 4 are mounted to the inner portions of both ends of the shaft 5 (FIG. 7). A base shaft 3 penetrates through, and protrudes from, these bearings 4. One of the ends of the base shaft 3 penetrates through a bearing disposed on the side wall of the machine frame 35, and an adjustment pulley 13 is fitted to the outer periphery of the shaft 3 outside the side wall and is interconnected to a control pulley 12 through a timing belt. The control pulley 12 is interconnected to the servo motor 14 inside the machine frame and can be controlled automatically.

The other end of the base shaft is supported by a metal bearing disposed on an auxiliary rod 37 that constitutes the other side wall of the machine frame.

The right and left wheels 11 are rotatably fitted to both protruding ends of the support shaft penetrating eccentrically through the shaft core portion 2 of the base shaft 3. The base shaft can be pulled out by pulling the auxiliary rod 37 in the direction indicated by an arrow F after the wheels are removed, and the belt can thus be changed.

It is preferred to directly interconnect the motor pulley 8 to the main gear 6 with a belt because the apparatus can be made more compact.

When the motor is driven, the driving force is sequentially transmitted to the motor pulley 8, the transmission pulley 9, the driving gear 7 and the main gear 6, and the mowing rotary member 16 is rotated. However, the base shaft 3 is restricted and kept motionless by the adjustment pulley 13 which stops at the position where it is restricted by the control pulley 12 through the timing belt 18. Furthermore, the support shaft 1, which is disposed eccentrically to the shaft core portion of the base shaft 3, is retained at the angle restricted by the stationary base shaft, and the position of height is determined. In consequence, when the adjustment pulley rotates as indicated by the arrow, the support shaft 1 is rotated from $O_0$ to $O_1$ or $O_2$, and the height of the wheels-supported by it changes with respect to the machine frame. Even when the base shaft 3 is fixed, the mowing rotary member is rotatably moved with respect to the base shaft 3 by the bearing 4 and can be driven by a prime mover such as an internal combustion engine and a motor. Incidentally, the manual operation by the anchor device of Example 1 without using the servo motor for the control apparatus is also preferred because it is more economical.

Figure 9:
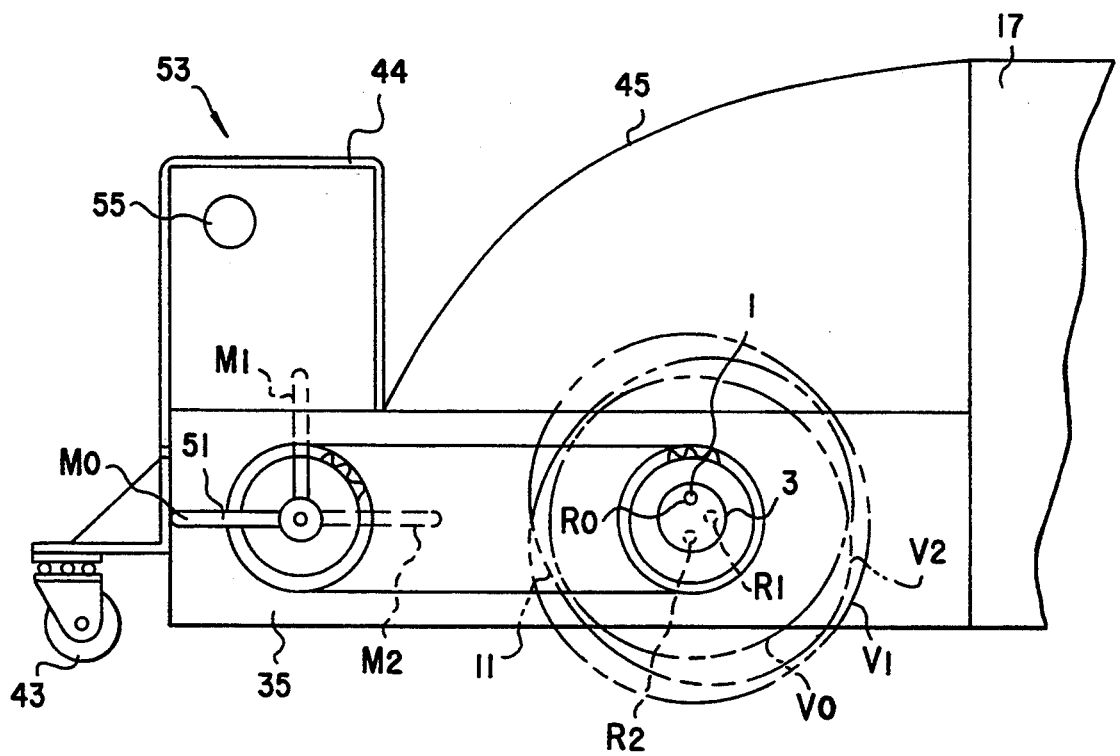
FIG. 9 is a schematic left-hand side view of the composite shaft type mowing machine when a front wheel is provided in a fourth embodiment of the present invention.
Figure 11:
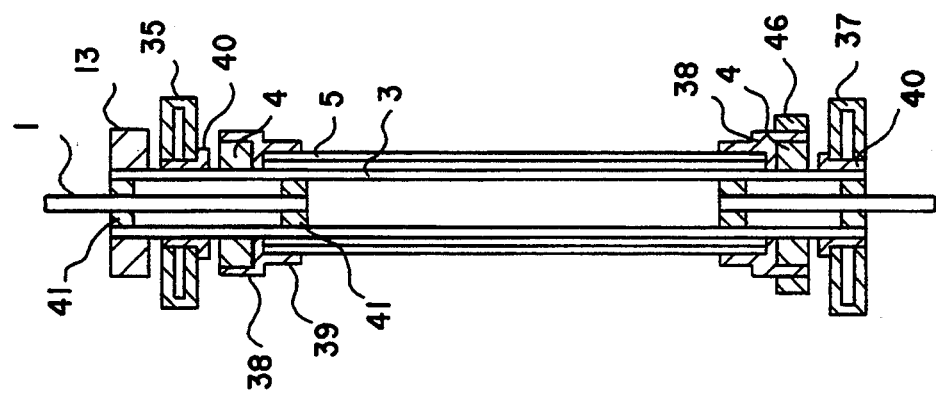
FIG. 11 is a sectional view taken along a one-dot-chain line a—a' in FIG. 9.
Figure 10:
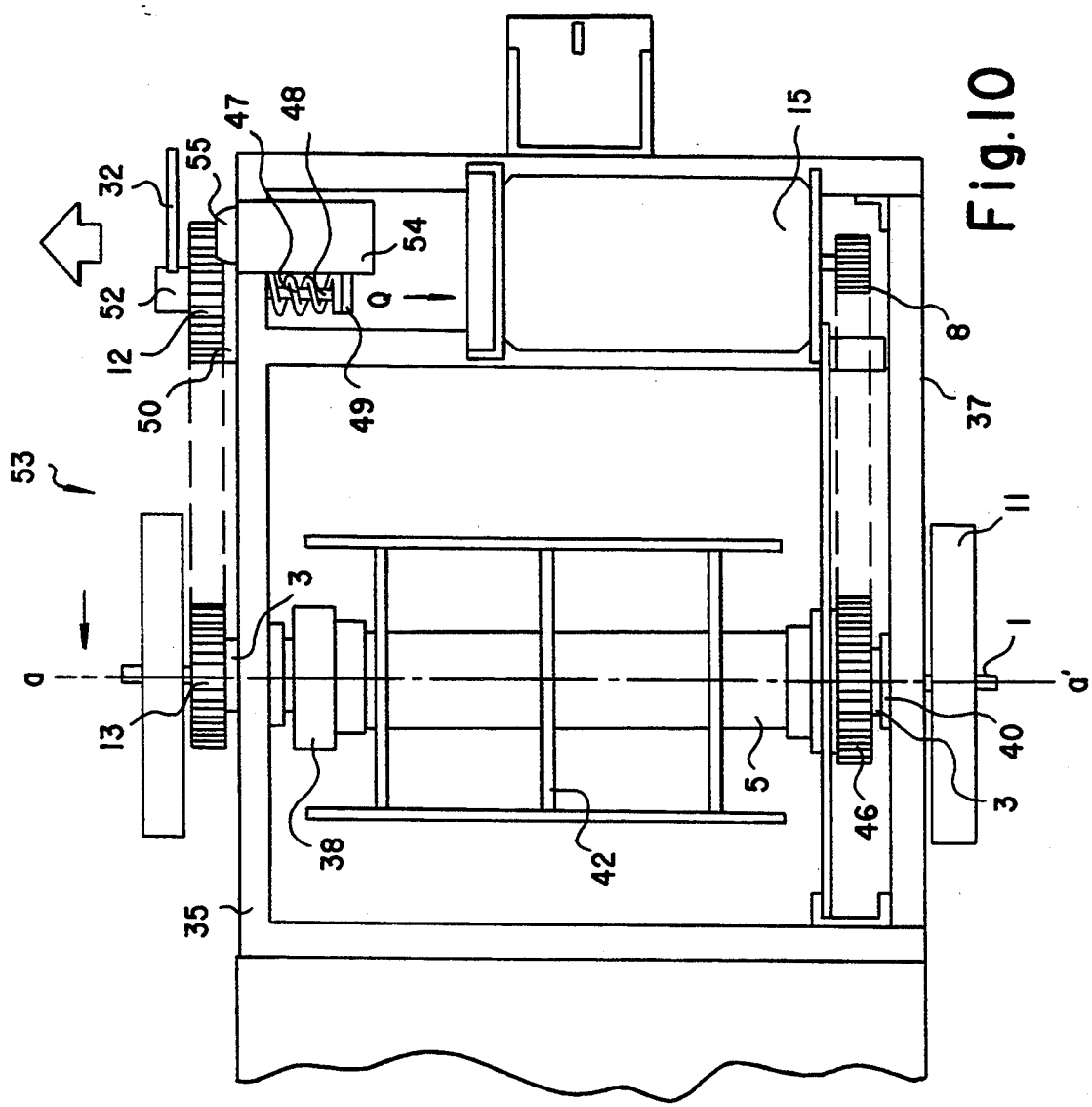
FIG. 10 is a schematic plan view of the embodiment shown in FIG. 9 when a hood and a motor cover are removed.

In a fourth embodiment of the present invention, the composite rotary shaft comprising three shafts is made light in weight, and the diameter of the large diameter shaft, that is, the rotary shaft, is reduced by bringing the diameter as close as possible to the diameter of the base shaft as the intermediate shaft, and thus a margin space at the timing of fitting of various rotary members is enlarged. In a three-shaft composite shaft type mowing machine shown in FIGS. 9, 10 and 11, the auxiliary rod 37 is removably fitted to one of the sides of the frame constituting the rectangular machine frame 35, and the motor 15 and the motor controller 54 are fixed on the front portion of the frame of the machine frame 35. A composite shaft type work rotary member comprises the rotary shaft 5 and the bearing case 38 that are integrally fixed, and rotates round the base shaft 3 as the center through the bearings 4 on both sides with a circle represented by one-dot-chain line L (FIG. 9) being the maximum outer periphery. The driving pulley 46 is integrally fixed to the outer periphery of the bearing case 35 on the left side of this rotary shaft 5 (FIG. 11), and the timing belt engaging with the driving pulley 46 is fitted over the motor pulley 8. The other end of the rotary shaft 5 is fitted to a rotary shaft fixing portion 39 of the bearing case 46 and the adjustment pulley 13 is integrally fixed to the outer periphery of the bearing case. The adjustment pulley 13 is interconnected to the control pulley 12 through the timing belt (FIG. 10).

A rectangular pipe constituting the machine frame 35 rotates or rotatably supports the base shaft 3 through the metal bearing 40 inside the adjustment pulley 13 described above.

The support shaft 1 is provided on both sides by rotatably supported bearings 41 fixed inside the base shaft 3.

Next, a control shaft 48 is disposed (either fixed or rotatably supported) in the shaft hole of the control pulley 12 for controlling the rotating angle of the adjustment pulley 13 through the timing belt, and is pulled in a direction indicated by an arrow Q by a spring stop 49 through a compression spring 47 inside the machine frame while penetrating through the rectangular pipe constituting the frame of the machine frame 35. Accordingly, when the control rod 51 fixed to a boss 52 of the control pulley 12 is pulled in a direction indicated by a large arrow, the control pulley comes off from the anchor protuberances disposed on a control panel as shown in Example 1 (FIG. 5) and becomes rotatable with the control rod (FIG. 9). When the control rod M rotates in the direction of the arrow A, the adjustment pulley 13, too, is rotated through the timing belt 18 and at the same time, the support shaft 1 which is eccentric rotates from R0 to R1, so that the wheels, too, are caused to move from V0 to V1 and their positions are raised to the intermediate stage.

Similarly, when the control rod 51 is rotated from M1 to M2, the support shaft 1, too, is rotated from R1 to R2 and the wheels are lowered from V1 to V2. In this way, the vertical height can be adjusted.

As described above, according to the present invention, the base shaft having the eccentric support shaft is rotated or supported rotatably at both ends and the rotating angle of this base shaft is adjusted and controlled on one of the sides thereof. Thus, the position of height of the support shaft can be adjusted. Next, the support height adjustment structure of the support shaft comprises one shaft and two wheels and nonetheless, the right and left two wheels can be positioned and adjusted to the same position of height by adjusting the rotating angle on only one of the sides of the base shaft. This adjustment structure is compact and can be operated easily and quickly. In other words, complicated engagement ports, racks and pinions, hydraulic devices, etc., are not necessary for operating the operation main body, and step-less or automatic adjustment can be attained by assembling the gears or the timing pulley, the servo motor, etc. Furthermore, when the height adjustment structure is assembled into the rotary shaft main body, a uniaxial compact device can be accomplished. When the device is assembled in the shaft core of the rotary shaft of the real type operation rotary member and the ground contact surfaces of both right and left wheels are retained immediately below the device, the height of the operation rotary member can correctly follow the undulation of the ground and the mowing height of the mowing blade can be made uniform. Furthermore, damage to the mowing blade due to the vigorous impingement against the protruding ground can be prevented. A self-propelling type mowing machine for driving the support shaft can also be accomplished by supporting rotatably the support shaft of the composite rotary shaft by the base shaft.

Furthermore, a remote operation can also be accomplished by engaging the servo motor with the position adjustment structure using the eccentric shaft according to the present invention and by assembling them into a robot.

What is claimed is:

1. A position adjustment structure for a vehicle, comprising:
    a composite rotary shaft, including small, medium and large shafts rotatably supported in a main frame of the vehicle, said medium shaft engaging a phase adjustment means to form a base shaft, said small shaft forming a support shaft connected to said base shaft eccentrically off the rotational axis of said base shaft; and one or more wheels rotatably attached to a rotational axis of said support shaft,
    wherein said large shaft is rotatably connected to said base shaft with bearings and is driven by a prime mover disposed on said main frame.

2. A position adjustment structure for a vehicle, comprising:
    a reel type operation rotary member driven by a prime mover disposed on a main frame, said rotary member connected to a base shaft and being concentrically and rotatably supported by bearings, said base shaft protruding from both ends of said rotary member and being rotatably supported by said main frame;
    support members fitted to both right and left protruding end portions of a support shaft connected to said base shaft eccentrically off the rotational axis of said base shaft;
    an adjusting means fitted to each protruding end portion of said base shaft for adjusting the angle of eccentricity of said support shaft in relation to said base shaft; and
    a control member engaged with said adjusting means.

3. A position adjustment structure as recited in claim 2, further comprising a wheel rotatably attached to both protruding end portions of said support shaft.

4. A position adjustment structure as recited in claim 2, wherein said control member comprises a servo motor.

5. A position adjustment structure as recited in claim 2, wherein said operation rotary member comprises a lawn mowing machine.

6. A position adjustment structure as recited in claim 2, wherein said operation rotary member is a part of an operating mechanism of a robot.

* * * * *